United States Patent [19]
Schoch

[11] Patent Number: 5,802,966
[45] Date of Patent: Sep. 8, 1998

[54] DUAL MOUNT CONTROL SYSTEM

[75] Inventor: Daniel A. Schoch, Minster, Ohio

[73] Assignee: The Minster Machine Company, Minster, Ohio

[21] Appl. No.: 693,895

[22] Filed: Aug. 5, 1996

[51] Int. Cl.$^6$ .................................................... B30B 15/00
[52] U.S. Cl. ................. 100/35; 100/43; 100/53; 100/214; 248/550; 248/562; 248/638
[58] Field of Search .................................. 100/43, 48, 53, 100/99, 214, 269.07, 35; 248/550, 562, 563, 565, 615, 638

[56] References Cited

U.S. PATENT DOCUMENTS

| | | |
|---|---|---|
| 2,706,607 | 3/1955 | Withers et al. . |
| 3,189,303 | 6/1965 | Boothe . |
| 3,282,542 | 11/1966 | Goodwin et al. . |
| 3,296,853 | 1/1967 | Bêché ............................... 100/269.07 |
| 3,568,592 | 3/1971 | Harvanek ........................... 100/269.07 |
| 3,667,707 | 6/1972 | Mui . |
| 3,730,473 | 5/1973 | Pepi . |
| 3,836,134 | 9/1974 | Lowe et al. . |
| 3,923,294 | 12/1975 | Gold et al. . |
| 4,424,961 | 1/1984 | Takei . |
| 4,531,484 | 7/1985 | Kimura et al. . |
| 4,546,960 | 10/1985 | Abrams et al. . |
| 4,783,986 | 11/1988 | Koshelev . |
| 4,927,119 | 5/1990 | Frost . |
| 5,042,784 | 8/1991 | Murai et al. . |
| 5,052,510 | 10/1991 | Gossman . |
| 5,060,519 | 10/1991 | Chjitani et al. . |
| 5,127,622 | 7/1992 | Whelpley et al. . |
| 5,179,516 | 1/1993 | Choshitani et al. . |
| 5,180,958 | 1/1993 | Choshitani et al. . |
| 5,374,025 | 12/1994 | Whelpley et al. . |

FOREIGN PATENT DOCUMENTS

| | | |
|---|---|---|
| 0 410 647 | 1/1991 | European Pat. Off. . |
| 2350891 | 12/1977 | France .................................. 100/257 |
| 353911 | 10/1972 | U.S.S.R. ................................ 100/214 |
| 1325005 | 7/1987 | U.S.S.R. ................................ 100/214 |

*Primary Examiner*—Stephen F. Gerrity
*Attorney, Agent, or Firm*—Randall J. Knuth

[57] ABSTRACT

The invention includes a mounting system for a press having an elastomeric isolator operatively associated with the press bed along with an air mount isolator operatively associated with the press bed for support of the press bed relative to a floor. A monitoring mechanism is provided for activating the air mount isolator based on a predetermined condition of the press so that the press bed is supported by the elastomeric isolator before air mount isolator activation and the press bed is supported solely by the air mount isolator after activation.

17 Claims, 2 Drawing Sheets

DUAL MOUNT CONTROL SYSTEM

BACKGROUND OF THE INVENTION

1. Field of the Invention

The present invention relates to an improved method of, and, means for supporting mechanical presses whereby high frequency stamping vibration forces as well as low frequency imbalance forces and vibrations transmitted to the ground or supporting floor are reduced.

2. Description of the Related Art

It is known that a press support may be provided by mounting the press on metal springs such as coil springs, leaf springs or a combination of the two. In order to prevent the magnification of vibrations while the press is running, it is essential that the natural frequency of vibration of the spring system be considerably less than the frequency of vibration corresponding to the lowest unbalanced frequency to be dealt with. Friction or viscous damping may be introduced to prevent undue build-up of vibrations when the press is running up to working speed as it passes through the natural frequency of a spring mount system.

Additionally, various pneumatic devices have been proposed from time-to-time to give flexible support or coupling between one part of a press system or another, but an object of the invention is to supply a means for isolating a mechanical press from the supporting floor so as to prevent vibrations arising at the supported system, from being transmitted to and through the supporting floor.

FIG. 4 shows a diagram of the vertical steady state motion of a mechanical press versus the press speed in strokes per minute. The Y-axis shows the deflection of a press in inches, peak-to-peak, during press operation.

What is needed in the art is an apparatus and method to reduce the deflection of the press and the transmitted inertia force of the press at different levels of press speed.

SUMMARY OF THE INVENTION

The present invention provides an apparatus for supporting mechanical presses such that the forces created by the moving parts being out of balance are reduced before transmission to the supporting ground or floor. The apparatus includes the use of elastomeric press mounts or isolators on which the press sits for a particular range of press speeds. Upon the achievement of a particular press condition, speed for instance, air mount isolators located beneath the press are inflated to support the mechanical press from the floor. The behavior of air mounts at particular press speeds or conditions ensures that a minimum transmitted force is applied to the floor or ground structure beneath the press.

The invention comprises, in one form thereof, a mechanical press having a press bed and an elastomeric isolator operatively associated with the press bed. The elastomeric isolator supports the press bed relative to a floor. An air mount isolator is operatively associated with the press bed for supporting the press bed relative to a floor. A means, such as a microprocessor and controlled solenoid/relief valve is connected to the air mount for activating the air mount isolator based on a predetermined condition of the press so the press bed is supported by the elastomeric isolator before activation and the press bed is supported by the air mount isolator after activation.

The invention comprises, in another form thereof, a method of reducing force transmitted from an operating mechanical press to its supporting floor. The press has a monitorable operating condition. The method comprises providing an elastomeric mount adjacent the press for supporting the mechanical press on the floor and providing an air mount connected to the press for supporting the press on the floor when the air mount is activated. The method further includes monitoring a press operating condition and determining if the press operating condition is within a predetermined range. The method then includes the step of activating the air mount when the press operating condition is outside of the predetermined range, whereby the press is supported on the floor by only the air mount.

The invention comprises, in yet another form thereof, a mechanical press comprising a press bed with an adjacent elastomeric isolator, the elastomeric isolator supports the press bed relative to a floor. An air mount isolator is operatively associated with the press bed, supporting the press bed relative to the floor when activated.

A solenoid/relief valve is in communication with both an air supply and the air mount. A control unit, such as a microprocessor, is in communication with a press sensor and the solenoid/relief valve, the press sensor sending input signals to the control unit. The control unit sends signals to the solenoid/relief valve to open, close, or relieve pressure within the solenoid/relief valve based on the received input signals, whereby activation of the air mount isolators is dependant on particular input signals.

An advantage of the present invention is through the use of either elastomeric press mounts and selectively actuated pneumatic or air press mounts transmitted force from the press to the ground or floor may be minimized.

Another advantage of the present invention is that the mounting apparatus operates automatically based upon a particular press operating condition such as press speed, strokes per minute, press acceleration, or a force sensor monitoring the transmitted force from the press to the supporting floor or ground.

Yet another advantage of the present invention is that the air mounts may be located within the elastomeric rubber rings to thereby attempt to minimize the footprint or area taken up by the press.

Another advantage of the present invention is that the system may be applied to alternate types of large machinery such as engines, pumps, compressors, and other similar machinery.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
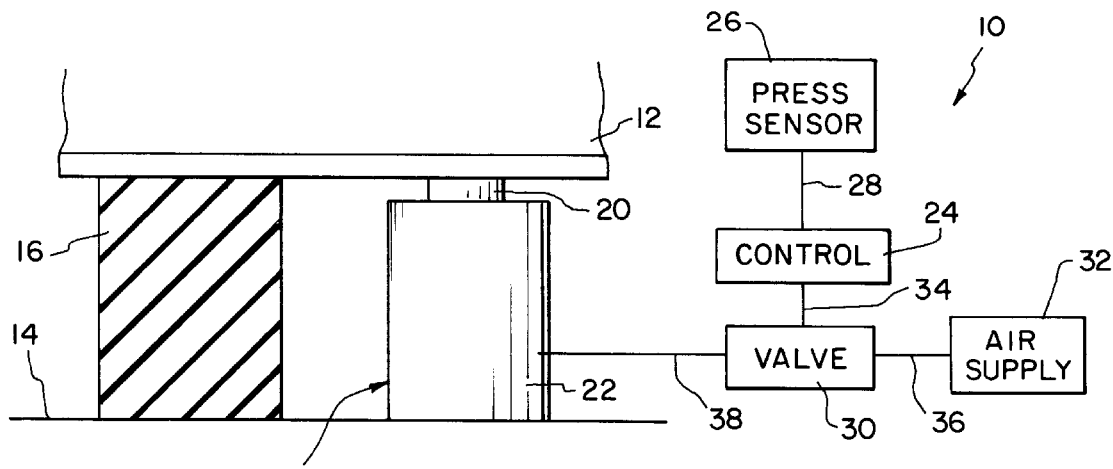
FIG. 1 is a diagrammatic view of the apparatus of the present invention.

Referring now to the drawings and particularly to FIG. 1, there is shown the dual mount control system for the present invention. A press bed 12 is represented in block form although press beds come in various types of shapes and sizes. In some presses, the press bed may include an attached or integral foot portion. The term press bed is hereby defined to include such press foot portion in addition to the typical press bed portion. Press bed 12 is supported upon ground or floor 14 by means of an elastomeric isolator 16.

Elastomeric isolator 16 may be made from a number of different semi-solid materials such as urethane, rubber, and other materials having a natural resonant frequency much higher than the frequencies of forces to be damped from press bed 12 to floor 14.

Figure 2:
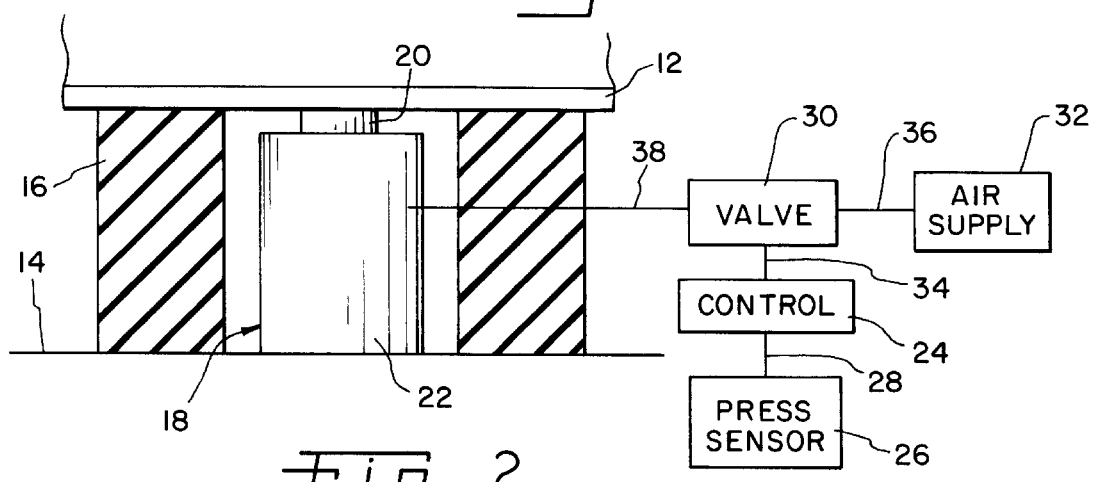
FIG. 2 is a diagrammatic view of an alternate embodiment of the present invention.

A pneumatic, bladder, or air mount isolator unit 18 is disposed between floor 14 and bed 12. In its unactuated state, air mount unit 18 permits bed 12 to ride upon elastomeric press mount 16 (FIGS. 1 and 2).

Figure 3:
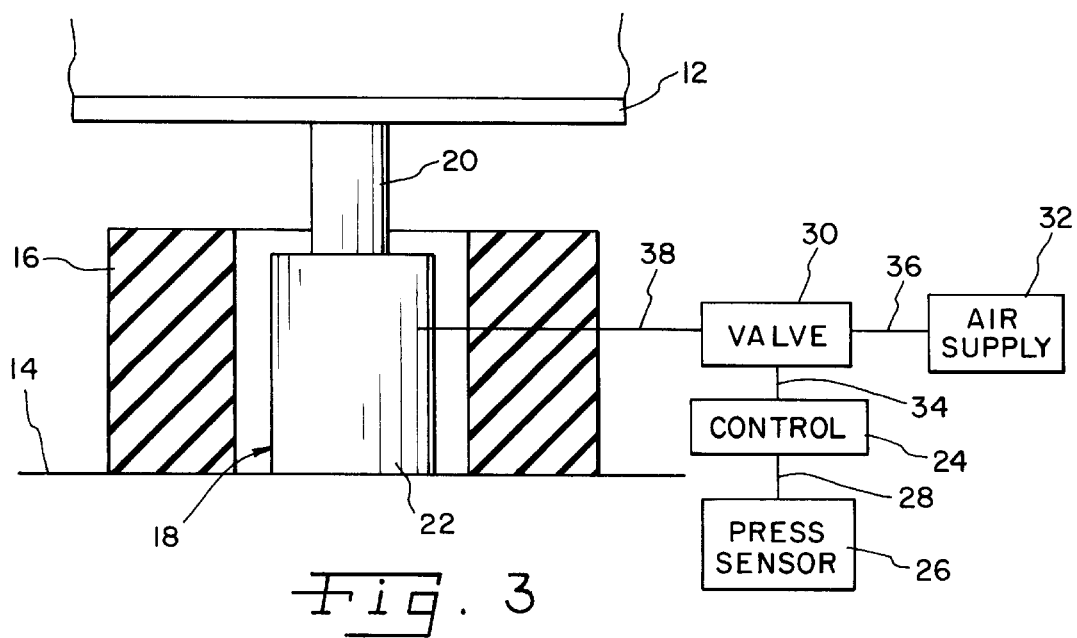
FIG. 3 is a diagrammatic view of the alternate embodiment of FIG. 2 in the actuated state.

On actuation, air mount unit 18 displaces press bed 12 away from elastomeric press mount 16 (as shown in FIG. 3) or alternatively lifts both press bed 12 and elastomeric mount 16 from floor 14 (not shown). In both cases, press vibrations and forces are no longer permitted to transfer through elastomeric press mount 16 to floor 14, but rather forced to travel through air mount unit 18. Although but a single elastomeric/air mount isolator pair is shown in FIGS. 1-3, most presses will contain a plurality of each of the isolators 16, 18, possibly not equal in number.

Various type of air mount units 18 may be equivalently utilized in the present system. As shown in the FIGS. 1-3, air mount unit 18 includes a piston-like plunger 20, attached to press bed 12, which is extendable toward and away from body cylinder 22 of unit 18.

As shown in FIG. 1, air mount unit 18 may be located and attached to bed 12 at a location separate and apart from elastomeric press mount 16. Preferably, elastomeric press mount 16 may be formed in the shape of ring (FIGS. 2 and 3), with air mount unit 18 disposed therein.

In an alternate embodiment, air mount unit 18 could be integrally formed with an elastomeric mount 16 thereabout, with a thin diaphragm type plunger (not shown) located therein. When activated, this diaphragm type plunger would lift, causing press vibrations and forces to be transmitted through air mount unit 18 instead of elastomeric mount 16.

Control of system 10 operation is by use of an electric or electronic control or activation means, such as a microprocessor 24. Inputs to microprocessor 24 include at least one press sensor 26, in communication with microprocessor 24 such as, by example, over a connected communication line 28.

Press sensor 26 may measure one or more press operating conditions such as press inertia forces transmitted to the floor, crankshaft speed, slide velocity, press rigid body motion displacement, press acceleration, a press transmitted vibration level or speed. Signals representing one or more of these predetermined conditions are then communicated to microprocessor 24, over communication line 28.

Based on the particular signal received, microprocessor 24 will determine, for the predetermined condition, if such signal is within a predetermined limit range or value. If microprocessor 24 determines that the predetermined condition is out of range or above a predetermined limit, microprocessor 24 will cause a solenoid/relief valve 30 to open, thereby permitting fluid such as air to be communicated from air supply 32 to air mount unit 18. This communication of fluid or air pressure will cause air mount unit 18 to actuate, thereby causing press vibrations or forces to be transferred to floor 14 through air mount unit 18 instead of elastomeric mount 16. Microprocessor 24 controls solenoid/relief valve 30 via a communication line 34. If more than one air mount unit 18 is utilized with press bed 12, the air mount units 18 may be operationally connected so that they will all provide substantially simultaneous equal lift to bed 12 when actuated.

Additionally, microprocessor 24 may release pressure within air mount unit 18 in a similar way with solenoid/relief valve 30 on receiving another signal from press sensor 26. This action would cause press bed 12 to again form a direct connection through elastomeric mount 16 to press floor 14 for the transfer of press vibration and forces.

Alternatively, air mount 18 activation could be set from a predetermined speed setting input from an operator or press controller. This function would permit the system to anticipate a predetermined speed of the press, while the press was running up to the predetermined speed.

Figure 4:
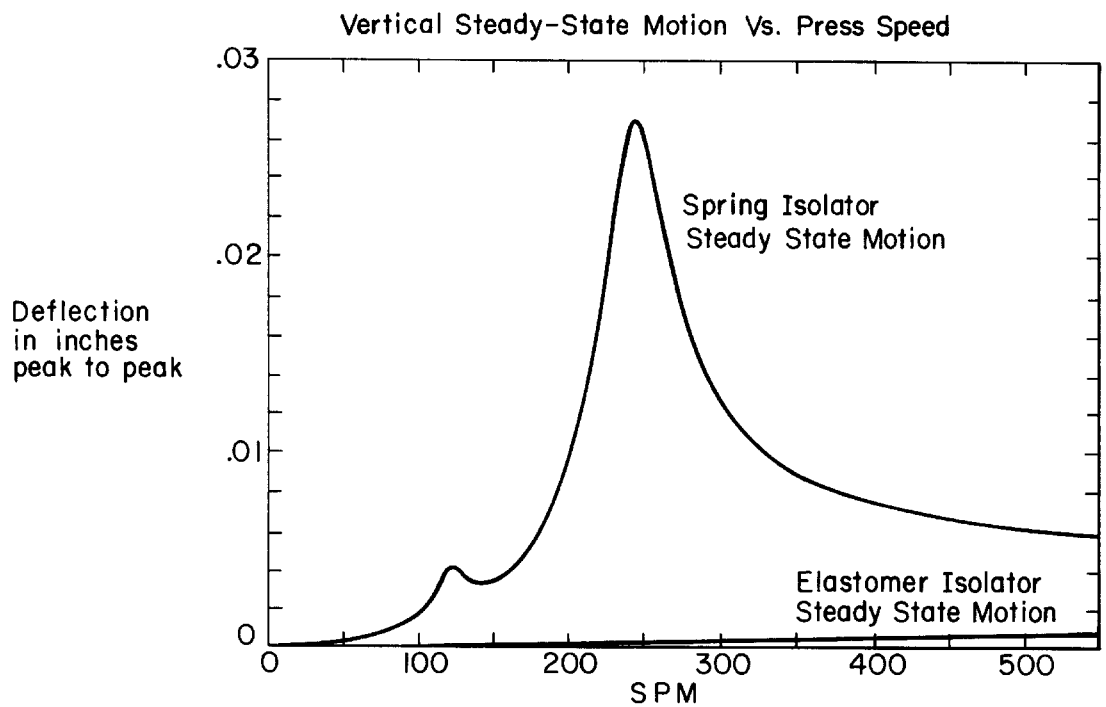
FIG. 4 is a graph depicting deflection in inches of a mechanical press versus stroke per minute speed of the press with either a spring (air or fluid) isolator or an elastomeric isolator.

FIG. 4 depicts a graph of the typical responses of elastomeric mounts as a function of press speed. Additionally this graph depicts the response of air mount or air spring press mounts (isolators) at similar press speeds.

Figure 5:
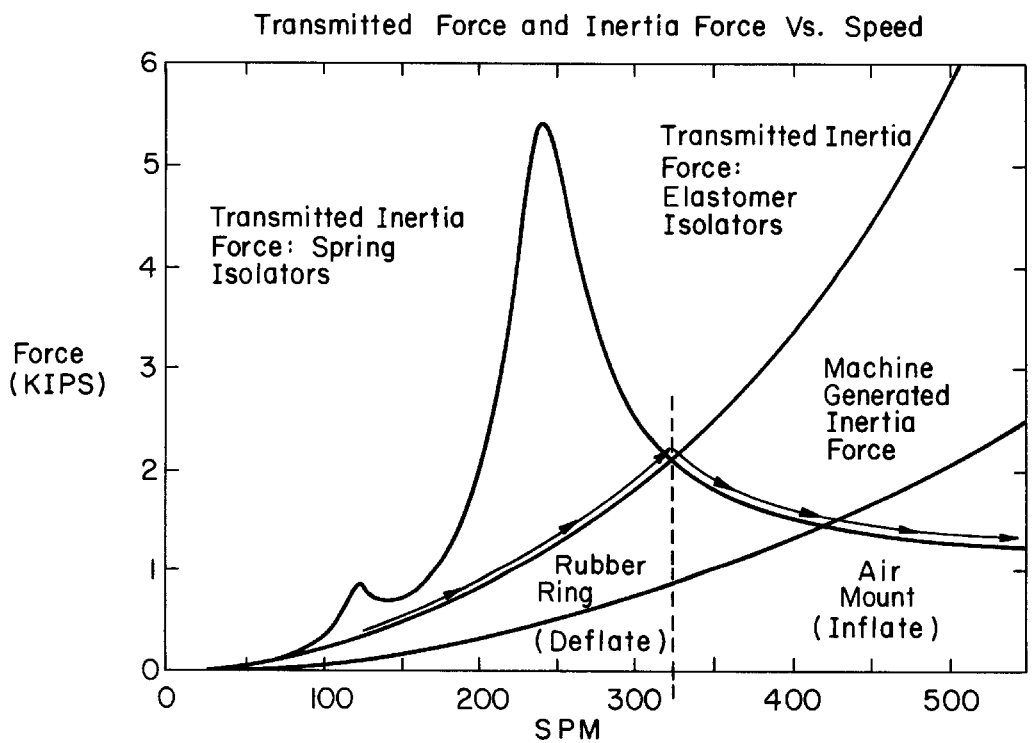
FIG. 5 is a graph showing the force transmitted to a floor for a typical mechanical press at a variety of different stroke per minutes speed. The arrowed line depicts the minimized press force transmitted through operation of the present invention.

FIG. 5 depicts how system 10 in operation reduces transmitted forces from the machine to floor 14. From a press speed of zero strokes per minute (0 SPM) to, in this case, approximately three hundred and twenty five strokes per minute (325 SPM) the press vibration and force transmitted curve follows that of elastomeric mount 16 (isolator). In this speed range example (0 to 325 SPM) air mount 18 is not activated.

At approximately three hundred and twenty five strokes per minute (325 SPM) microprocessor 24, based on press speed input from press sensor 26, will activate solenoid/relief valve 30 thereby causing pressurized fluid from air supply 32 to be communicated to air mount 18 and activate same. As seen in FIGS. 1-3, air supply 32 is connected to solenoid/relief valve 30 by a line 36 and valve 30 is connected to air mount unit 18 by a line 38. Actuated air mount 18 (FIG. 3) will cause press forces to be transmitted to floor 14 through air mount 18. Thus, the transmitted press forces, as shown on FIG. 5 follow that of air mounts for the press speed above approximately three hundred and twenty five strokes per minute (325 SPM). The resultant of the above apparatus and method minimizes the force transmitted from the press and approximately follows the arrowed line in FIG. 5.

By changing whether the vibration and forces are transmitted through elastomeric isolator mount 16 or air mount isolator 18, transmitted forces applied to the ground or floor 14 are minimized. Although FIG. 5 depicts the activation of air mount 18 based on a press speed of 325 strokes per minute, other press parameters and particular activation limits or levels may also be utilized to minimize transmitted forces. The particular limit value or parameter (in this case of a press speed of 325 SPM) may change dependent upon the particular press weight, geometry, and die configurations.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A mechanical press comprising:

a press bed;

an elastomeric isolator operatively associated with said press bed, said elastomeric isolator for supporting said press bed relative to a floor;

an air mount isolator operatively associated with said press bed, said air mount isolator for supporting said press bed relative to a floor; and means for activating said air mount isolator based on a predetermined condition of said press so said press bed is supported by said elastomeric isolator before said activation and said press bed is supported by said air mount isolator after said activation.

2. The mechanical press of claim 1 in which said elastomeric isolator is formed of rubber.

3. The mechanical press of claim 1 in which said predetermined condition is a particular speed of the press during operation.

4. The mechanical press of claim 1 in which said predetermined condition is the speed of the press that minimizes press force transmitted to the floor when said air mount isolator is activated.

5. The mechanical press of claim 1 in which said predetermined condition is a predetermined transmitted vibration level.

6. The mechanical press of claim 1 in which said predetermined condition is approximately 300 to 350 strokes per minute press speed.

7. The mechanical press of claim 1 in which said predetermined condition is approximately 325 strokes per minute press speed.

8. The mechanical press of claim 1 in which said activating means further comprises:

an air supply;

a press sensor;

a solenoid valve in communication with said air supply and said air mount; and a control unit in communication with said press sensor and said solenoid, said press sensor sending input signals to said control unit, said control unit sending signals to said solenoid valve to open and close said solenoid valve based on received said input signals, whereby activation of said air mount isolators is dependant on particular input signals.

9. The mechanical press of claim 8 in which said input signals correspond to speed of the press.

10. The mechanical press of claim 8 in which said input signals correspond to the acceleration of the press.

11. The mechanical press of claim 1 in which said elastomeric isolator is formed of a rubber ring.

12. The mechanical press of claim 11 in which said air mount isolator is disposed in said rubber ring.

13. A method of reducing force transmitted from an operating mechanical press to its supporting floor, said press having an operating condition, the method comprising:

providing an elastomeric mount adjacent said press for supporting said mechanical press on the floor;

providing air mounts connected to said press for supporting said mechanical press on said floor when activated;

monitoring the press operating condition of said mechanical press;

determining if the press operating condition is within a predetermined range; and activating said air mounts when the press operating condition is outside of the predetermined range whereby the mechanical press is supported on the floor by only said air mounts.

14. The method of claim 13 in which said monitoring step comprises monitoring the speed of the mechanical press.

15. The method of claim 13 in which said monitoring step comprises monitoring the acceleration of the mechanical press.

16. The method of claim 13 in which said monitoring step comprises monitoring the force transmitted to the floor by the mechanical press.

17. A dual control mount system for a mechanical press having a press bed, the system comprising:

an elastomeric isolator adjacent said press bed, said elastomeric isolator for supporting said press bed relative to a floor;

an air mount isolator operatively associated with said press bed, said air mount isolator for supporting said press bed relative to a floor;

an air supply;

a press sensor;

a solenoid valve in communication with said air supply and said air mount; and a control unit in communication with said press sensor and said solenoid, said press sensor sending input signals to said control unit, said control unit sending signals to said solenoid valve to open and close said solenoid valve based on received said input signals, whereby activation of said air mount isolator is dependant on particular input signals.

* * * * *